United States Patent [19]
Fateley et al.

[11] Patent Number: 5,257,086
[45] Date of Patent: Oct. 26, 1993

[54] OPTICAL SPECTROPHOTOMETER HAVING A MULTI-ELEMENT LIGHT SOURCE

[75] Inventors: William G. Fateley; Andrzej Rys; Radoslaw Sobczynski, all of Manhattan, Kans.

[73] Assignee: D.O.M. Associates Int'l, Manhattan, Kans.

[21] Appl. No.: 895,585

[22] Filed: Jun. 9, 1992

[51] Int. Cl.$^5$ ............................ G01J 3/28; G01J 3/10; G01J 3/32
[52] U.S. Cl. ................................. 356/328; 250/553; 356/310; 372/53
[58] Field of Search ............... 356/326, 328, 310, 329, 356/330—334, 302, 305, 73, 432; 250/553; 372/50, 53

[56] References Cited

U.S. PATENT DOCUMENTS 3,910,701 10/1975 Henderson et al. ................. 356/73
5,073,029 12/1991 Eberly et al. ....................... 356/432
5,139,335 8/1992 Lundeen et al. .................... 356/328

FOREIGN PATENT DOCUMENTS 0086027 3/1989 Japan .................................. 356/329

OTHER PUBLICATIONS

Swift et al "Hadamard Transform Imager and Imaging Spectrometer", Applied Optics, vol. 15, #6, Jun. 1976, pp. (1595–1609).

Primary Examiner—Vincent P. McGraw
Assistant Examiner—K. P. Hantis
Attorney, Agent, or Firm—Hovey, Williams, Timmons & Collins

[57] ABSTRACT

A spectrophotometer includes an array of light emitting diodes configured for activation in successive Hadamard encodement patterns, a diffraction grating, an optical slit, a detector and electronic controls including a computer. In operation, the diffraction grating disperses and collimates radiation from the array and directs selected spectral components through the slit onto the detector whereupon the computer performs a Hadamard analysis on the detector signals.

34 Claims, 5 Drawing Sheets

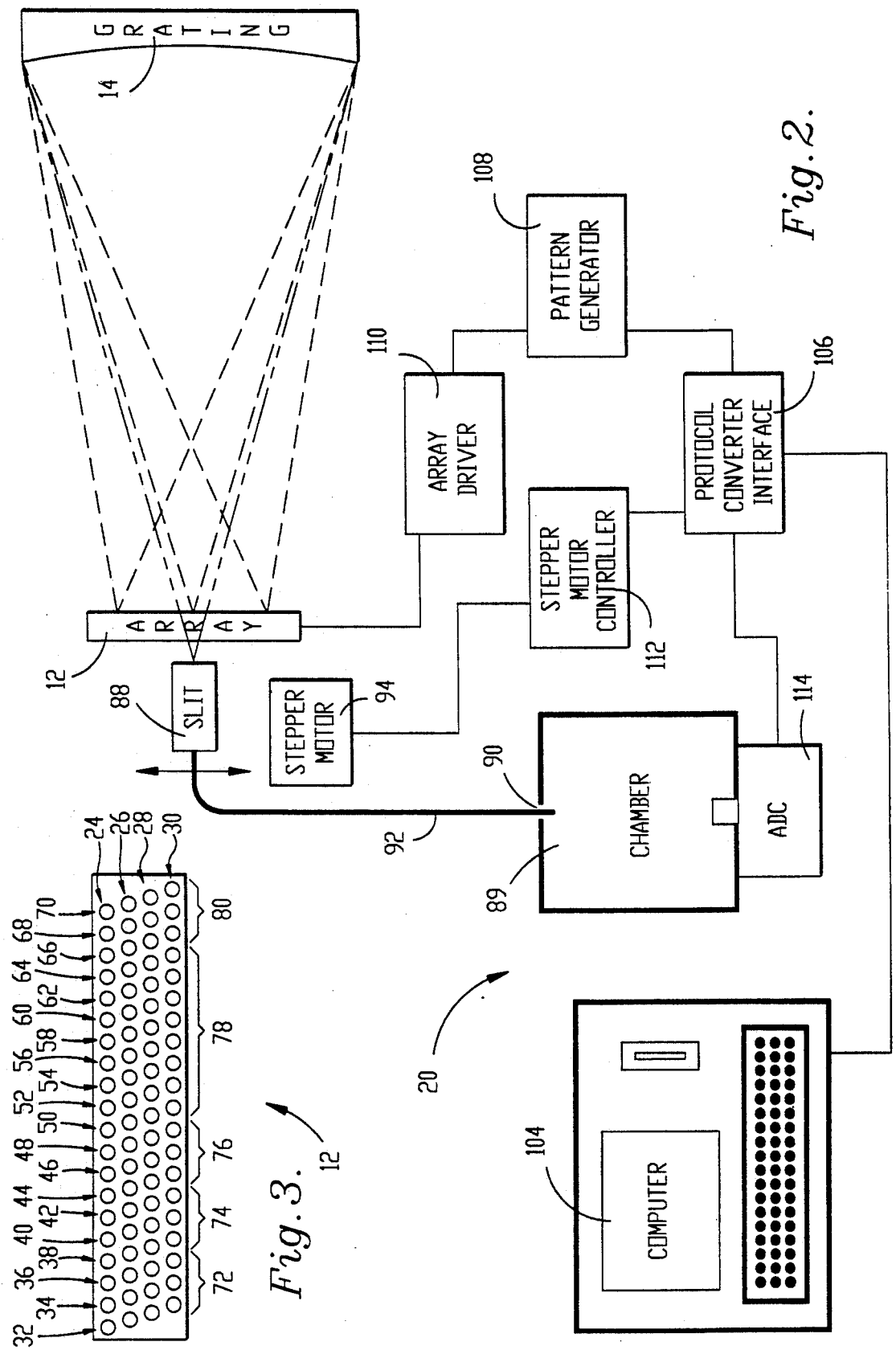

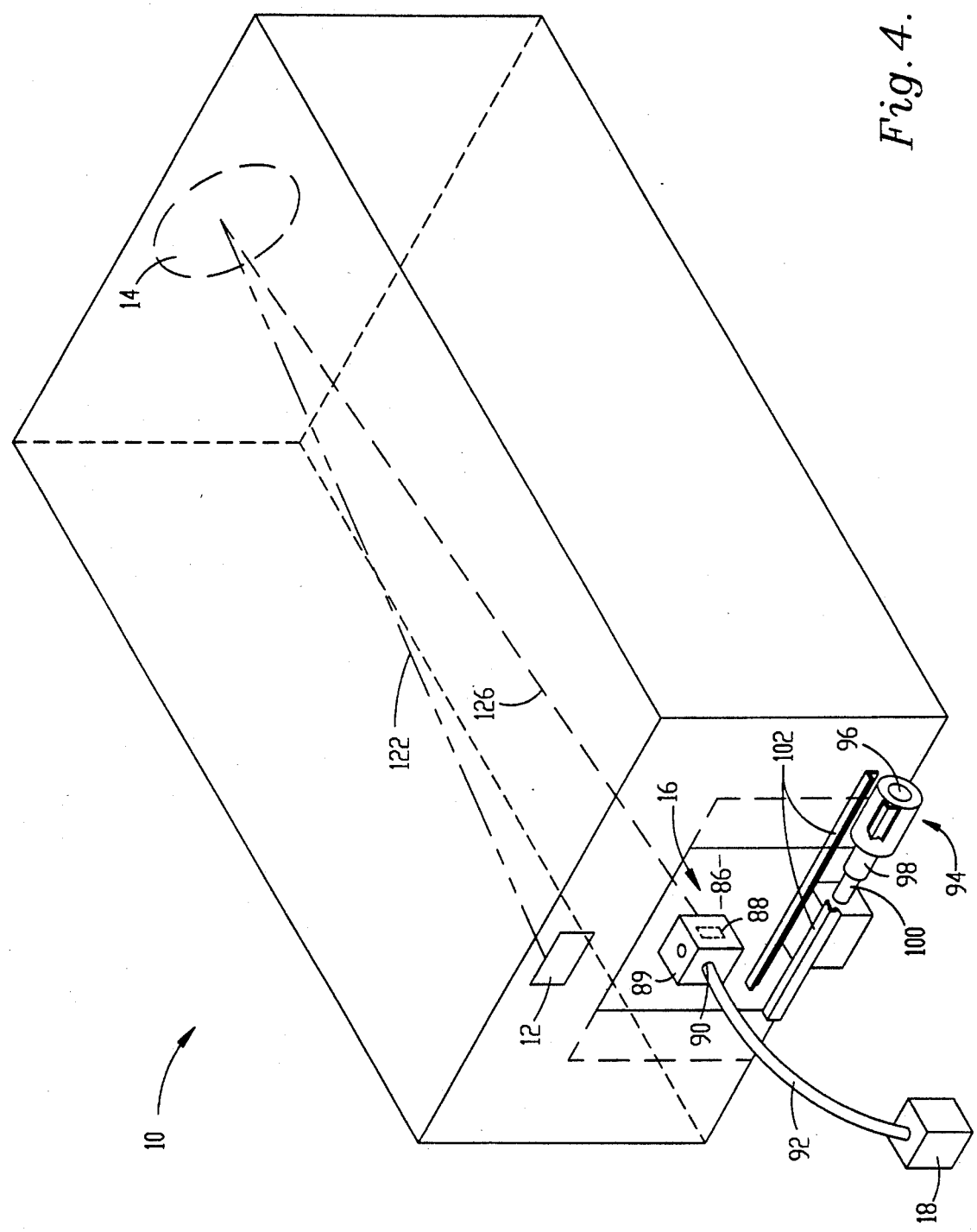

OPTICAL SPECTROPHOTOMETER HAVING A MULTI-ELEMENT LIGHT SOURCE

MICROFICHE APPENDIX

A Microfiche Appendix presents a computer program that demonstrates various control aspects for the operational processes of the spectrophotometer, as described herein. This Appendix is captioned "Appendix; Submission of Computer Program Listing in Application for U.S Letters Patent: OPTICAL SPECTROPHOTOMETER HAVING A MULTI-ELEMENT LIGHT SOURCE," and it contains thirteen total frames in one microfiche.

BACKGROUND OF THE INVENTION

1. Field of the Invention

The present invention relates to the field of optics and, more particularly, to spectrometric devices of the type incorporating a multiplex or Fellget advantage. Still more specifically, the invention pertains to a spectrophotometer using an array of radiation emitting elements configured for activation in Hadamard encodement or Fourier frequency encodement patterns.

2. Description of the Prior Art

Recent prior art regarding spectrometric devices of the type incorporating a multiplex or Fellget advantage have focused primarily upon various "masking" devices that implement the Hadamard multiplex advantage. The book "Hadamard Transform Optics" by Martin Harwit, et al., published by Academic Press in 1979, provides an excellent overview of the applied mathematical theory and the degree to which common optical components are used in Hadamard spectroscopy and imaging applications. Fateley U.S. Pat. No. 4,799,795, hereby incorporated by reference, discloses an electronically alterable vanadium dioxide crystalline mask interposed in an optical pathway between a light source and a detector. This mask has a matrix of optical cells activated by a computer linkage to form various Hadamard encodement patterns which consist of spatially arranged sets of cells in either opaque or transparent modes. Electronically operable masks present a distinct advantage over mechanically operated masks which are subject to misalignment, jamming, and lack of scan repeatability.

While the electronically alterable masks provided a significant advance in the state of the art, problems still remain. First, the cell components of the electronically alterable mask each contribute their own band of absorption to the spectra for analysis, which fact may detrimentally affect detector count readings within critical spectral regions of interest. Second, components within the cells may polymerize when they are exposed to certain spectral regions of light such as ultraviolet light, which circumstance renders the mask inoperable. Finally, although the crystalline mask operates more quickly than did the various prior mechanical mask devices, the individual cells of the crystalline mask still require a transition relaxation time to pass between the opaque and transparent modes. This relaxation time requirement and related delays may, under some operational demands, become a limiting factor in spectroscopic analysis.

Laser spectroscopy provides distinct advantages over conventional non-laser spectrophotometers in certain fields including absorption spectroscopy, fluorescence spectroscopy, Raman spectroscopy, and long range (e.g., atmospheric) spectroscopy. The advantageous laser characteristics include enhanced brightness, enhanced spectral purity, directionality, and the ability to produce light in extremely short pulses. Unlike the early laser amplifier materials that typically fluoresced light over a very narrow spectral region, modern materials, and particularly the organic laser dyes, are capable of fluorescing light in a relatively broad spectral range. This characteristic allows individual lasers to be tuned for output to different narrow spectral ranges by adjusting the angle at which laser light strikes a monochromator. The output can be further tuned for an extremely narrow frequency by additionally incorporating such devices as a Fabry-Perot etalon, which are also adjustable at different angles. An overview of this type of tuning apparatus particularly regarding dye lasers exists in the book "Topics in Applied Physics", *Dye Lasers,* Vol. 1, edited by F. P. Schafer, pp. 38-39, 69, 131, 190-193, published by Springer-Verlag in 1973, but similar apparatus is known in the art.

SUMMARY OF THE INVENTION

The present invention solves the prior art problems discussed above and provides a distinct advance in the state of the art. More particularly, the spectrophotometer hereof provides for very rapid analysis of a sample using Hadamard techniques without experiencing signal loss through mask absorption, and similar apparatus can apply Fourier techniques to generate an interferogram, which is analogous to interferograms from Fourier-type interferometry, by superposing waves of different frequencies without requiring the use of a beam splitting device such as those that are commonly applied in Fourier interferometry.

The present invention broadly includes an electromagnetic radiation source array composed of a plurality of solid state source elements configured for allowing activation in a plurality of multiplexing encodement patterns, a detector for detecting radiation emitted from the elements and for producing signals representative thereof, and electronic controls for activating the array patterns and for producing multiplex analyses of the signals. More particularly, the apparatus incorporates an optical pathway for directing radiation from the array to the detector with a diffraction grating in the pathway for dispersing and collimating the radiation so that selected components thereof are directed for impingement on the detector. In another embodiment, an organic dye cell placed between semitransparent mirrors receives focused radiation from the source elements whereupon lasing action is induced for laser spectrophotometry.

BRIEF DESCRIPTION OF THE DRAWINGS

FIG. 2 is a block diagram of the apparatus of FIG. 1;

FIG. 3 is a front elevational view of the preferred diode array;

FIG. 4 is a schematic three dimensional representation including the output slit assembly for the spectrophotometer of FIG. 1;

DETAILED DESCRIPTION OF THE PREFERRED EMBODIMENT

Figure 1:
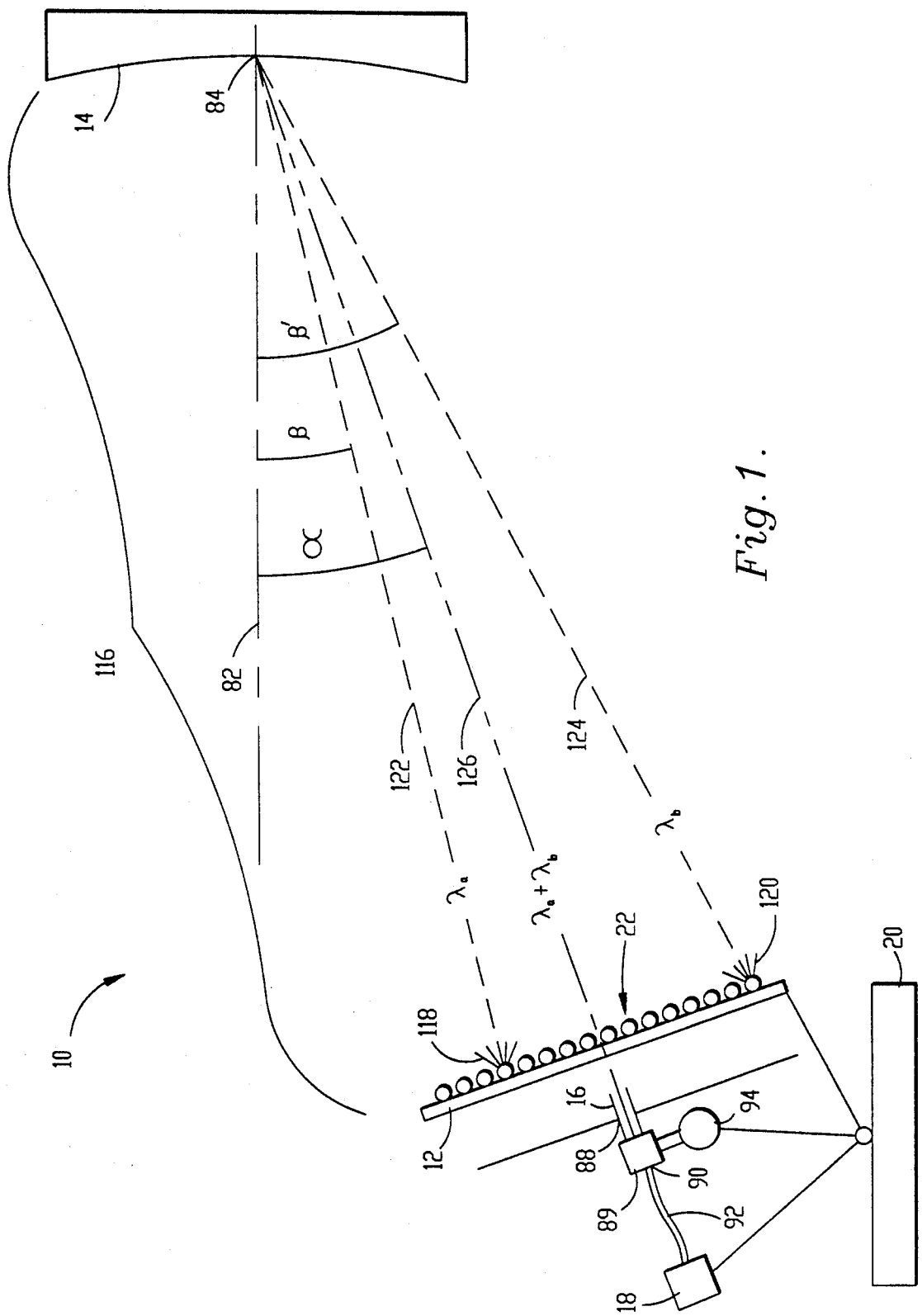
FIG. 1 is a schematic representation of the preferred spectrophotometer apparatus of the present invention.

FIG. 1 schematically illustrates the preferred spectrophotometer apparatus 10 which includes radiation source array 12, diffraction grating 14, output slit assembly 16, detector 18 and control assembly 20. Preferred array 12 includes eighty light-emitting diodes (LED) 22 as illustrated in FIG. 3.

As seen in FIG. 3, diodes 22 are arranged in four off-set rows 24-30 of twenty columns 32-70. As illustrated, diodes 22 emit light in different colors and the columns are arranged according to wavelength to present green region 72 (columns 32-36), yellow region 74 (columns 38-42), orange region 76 (columns 44-48), red region 78 (columns 50-64) and near infrared region 80 (columns 66-70).

Within each column 32-70, rows 24-30 are offset by one-quarter of a diode diameter for reasons that will become apparent below. Light emitting diodes are generally solid state devices that are constructed from various percentage alloy compositions to produce light of certain wavelengths. As those skilled in the art can appreciate, diodes 22 are selected according to the desired wavelength as illustrated by the examples of Appendix I. As semiconductor technology progresses, devices may be developed that emit radiation wavelengths not currently available, but which can be advantageously used in the present invention.

Diffraction grating 14 is of a concave, aberration corrected, holographic construction available from American Holographic of Littleton, Mass. Grating 14 has a concave gold or aluminum covered reflective focal surface that incorporates very fine rulings for monochromating and collimating light. Grating 14 presents an axis of symmetry 82 that passes through center point 84.

Slit assembly 16 is positioned below array 12 and is illustrated in more detail in FIG. 4. Assembly 16 includes slit body 86 with optical slit 88 defined therein, structure defining optical chamber 89, fiber optic coupler 90 coupled to body 86 in a position to receive radiation from chamber 90, fiber optic cable bundle 92 extending from coupler 90 to detector 18, stepper motor 94 presenting output shaft 96, tubular motor coupling 98 receiving shaft 96 in one end thereof, and stub shaft 100 having one end thereof received in the other end of coupling 98 with the other end of stub shaft 100 threadably received in shifting bracket 102. Activation of motor 94 causes rotation of shaft 96, coupling 98 and shaft 100. Rotation of the threaded end of stub shaft 100 shifts bracket 102 and thereby shifts body 86 and slit 88 so that a different set of radiation wavelengths are received therethrough. Thus, by selective controlled activation of motor 94, the set of wavelengths impinging upon detector 18 can be varied to suit the particular analyses being performed.

Preferred detector 18 is a lead sulfide photoresistor available from Infrared Associates, Inc. of Orlando, Fla., or Epitaxx, Inc. of Princeton, N.J. Other suitable detectors include a silicon photodiode or photovoltaic cell, an indium gallium arsenide phosphide photodiode or photovoltaic cell, or a phototransistor. In operation, detector 18 produces a voltage signal in response to and representative of the radiation impinging thereon.

Referring now to FIG. 2, control assembly 20 includes conventional, IBM compatible personal computer 104 (with a 486 type microprocessor), interface 106, Hadamard pattern generator 108, array driver 110, stepper motor controller 112, and analog to digital converter (ADC) 114 incorporating a preamplifier, operably interconnected as shown. Conventional interface 106 operates as a protocol converter enabling communications between computer 104 and devices 108-114.

Conventional pattern generator 108 includes an EPROM memory device (not shown) which stores the various Hadamard encodement patterns for array 12. In response to control signals from computer 104, generator 108 delivers signals representative of successive encodement patterns to driver 110. More particularly, generator 108 produces output signals to driver 110 indicating which of diodes 22 should be active during a particular encodement pattern. Moreover, the activation signals for a given pattern are in the form of oscillating on/off, i.e., square wave, signals so that the activated diodes are synchronized to emit light in this on/off manner, preferably at the rate of at least ten oscillations during each encodement pattern. Energizing diodes 22 in this manner allows electronic filtering of noise from the voltage signals of detector 18. As those skilled in the art will appreciate, this is analogous to mechanical "chopping" without the attendant disadvantages thereof and thereby presents a significant advantage of the present invention.

Conventional driver 110 includes a current stabilizer and a voltage regulator to yield very consistent output for energizing each of diodes 22 in square wave oscillation when activated.

Conventional stepper motor controller 112 allows computer 104 to position output assembly 16 with a degree of precision enabling scan repeatability. More particularly, controller 112 receives signals from computer 104 by way of interface 106 and converts these signals into a format suitable for activating stepper motor 94 to rotate the desired number of steps in order to position slit 88 for passage of the desired wavelengths.

ADC 114 is conventional in nature and receives the voltage signals from detector 18, amplifies these signals as analog input to the converter in order to produce a digital output representative of the voltage signals. As discussed further hereinbelow, computer 104 provides periodic activation signals to ADC 114 which responds by performing a conversion and delivering a digital output to computer 104 by way of interface 106.

Array 12, grating 14, slit assembly 16 and detector 18 cooperatively define optical pathway 116. Radiation emitted from array 12 impinges initially on grating 14 which separates the radiation into spectral components. Even though diodes 22 individually present a narrow spectral output, grating 14 further spreads the spectrum into finely resolved components. A spectral component from each energized diode is then reflected by grating 14 toward slit 88 so that a selected set of spectral components impinge on detector 18, the other component sets being prevented from impinging on detector 18 by the position of slit 88. When a different set of components are desired, computer 104 activates stepper motor 94 to shift slit 88 to allow the desired component sets to pass therethrough.

More particularly, the various elements of optical pathway 116 present a spatial arrangement that determines the way in which they interact to manipulate light from array 12. Light of combined wavelengths from the individual diodes 22, e.g., diodes 118 and 120, may operatively strike anywhere upon the surface of grating 14, but radiation paths 122 and 124 determine the horizontal angles $\beta$ and $\beta'$ between axis of symmetry 82 and respective paths 122, 124 to point 84. In this way, each diode 22 has a unique angle $\beta$ that serves to affect dispersion optics. Reflective path 126 extends downwardly from the grating surface, below array 12, through output slit 88, through sample chamber 89, and through fiber-optic cable 90 to detector 18. Angle $\alpha$ measures the horizontal angle between axis of symmetry 82 and path 126.

By way of operational overview, diodes 22 are activated to emit radiation in a successive set of Hadamard encodement patterns. The resultant set of spectral components passing through slit 88 is detected by detector 18 which provides signals representative thereof. Computer 104 then processes these signals to produce a Hadamard analysis. Computer 104 operates according to a control program that governs the operations of spectrophotometer apparatus 10. A copy of this program, which is written in Basic, is submitted herewith as the Microfiche Appendix. The program listing is an exemplary way of demonstrating a control mechanism for data acquisition, the clock synchronization of the various components, and a direct mathematical solution for the $S_{79}$ Hadamard matrix.

Computer 104 initiates an analysis by prompting pattern generator 108 to activate the successive Hadamard encodement patterns on array 12 by way of driver 110. More particularly, array 12 includes eighty diodes 22 which requires seventy-nine Hadamard encodement patterns in which a different sets of diodes 22 are active and inactive during each pattern according to well known Hadamard mathematics. With each pattern, a set of wavelength components are resolved by grating 14 and directed along path 126 through slit 88 onto detector 18. In synchrony with the activation of encodement patterns, computer 104 also takes readings from ADC 114, that is, samples data at a rate of at least twice that of the oscillation of diodes 22 during activation. These readings enable computer 104 to solve a conventional fast Fourier transform and thereby eliminate background noise from the readings for analysis.

For example, diodes 118,120 produce light that includes the specific wavelengths $\lambda_a$ and $\lambda_b$. Light from diodes 118,120 travels along respective exemplary paths 122,124 to strike diffraction grating 14 for dispersion and collimation into approximately singular wavelength band components, e.g., $\lambda_a$ and $\lambda_b$. The combined reflection forms a beam along path 126, and the beam contains a combination of wavelengths, $\lambda_a$, $\lambda_b$, etc. In this manner, the beam contains one wavelength component representation for each activated diode of the array. The beam along path 126 passes through sample chamber 89 where material may be inserted for spectrographic analysis, and it then impinges upon detector 18.

In response, detector 18 sends a resultant analog voltage signal to detector ADC 114, which converts the signal to digital for transmittal to interface 106, which in turn sends it to computer 104. Computer 104 receives the detector signals within a time domain that is synchronized with the pattern activation signal for array 12, and the process is repeated in a sufficient number of different Hadamard patterns (e.g., seventy-nine) to constitute a complete scan. Computer 104 then applies the detector signals as input to solve a conventional Hadamard algorithm that mathematically yields intensity counts in respective wavelengths (e.g., $\lambda_a$ and $\lambda_b$) that represent each of diodes 22.

One complete set of encodement patterns constitutes one "scan" and, in the preferred embodiment, sixty-four scans are performed per second. Because of the rapid response time of the preferred diodes 22, it is possible to operate array 12 at this scan rate which has not been possible in the prior art. Additionally, this rapid scan rate allows many sets of data to be taken and averaged in order to increase the overall accuracy of the analysis. After one analysis is performed, computer 104 can activate slit assembly 16 to shift slit 88 to allow passage of a different set of spectral components in order to perform another analysis using these components.

As those skilled in the art will appreciate, the present invention can also be used to superpose waves of different frequencies and thereby generate an interferogram that is analogous to a Fourier-type interferogram as can be obtained for example from a Michelson interferometer, except that the present invention does not require a beam splitting device in order to develop the interferogram. In such an application, pattern generator 108 energizes each of diodes 22 at a discrete, known oscillation frequency to produce a Fourier frequency oscillation pattern. With these discrete oscillation frequencies, computer 104 can use the corresponding data received from detector 18 to mathematically extract for the Fourier type interferogram the intensity of each optical frequency. Such a result would avoid the need for the traditionally requisite beam splitting Fourier interferometer device. Although the Hadamard device is most preferred, the invention still contemplates both the Fourier type of frequency oscillation device and the Hadamard device as generally incorporating "multiplexing encodement patterns."

Figure 5:
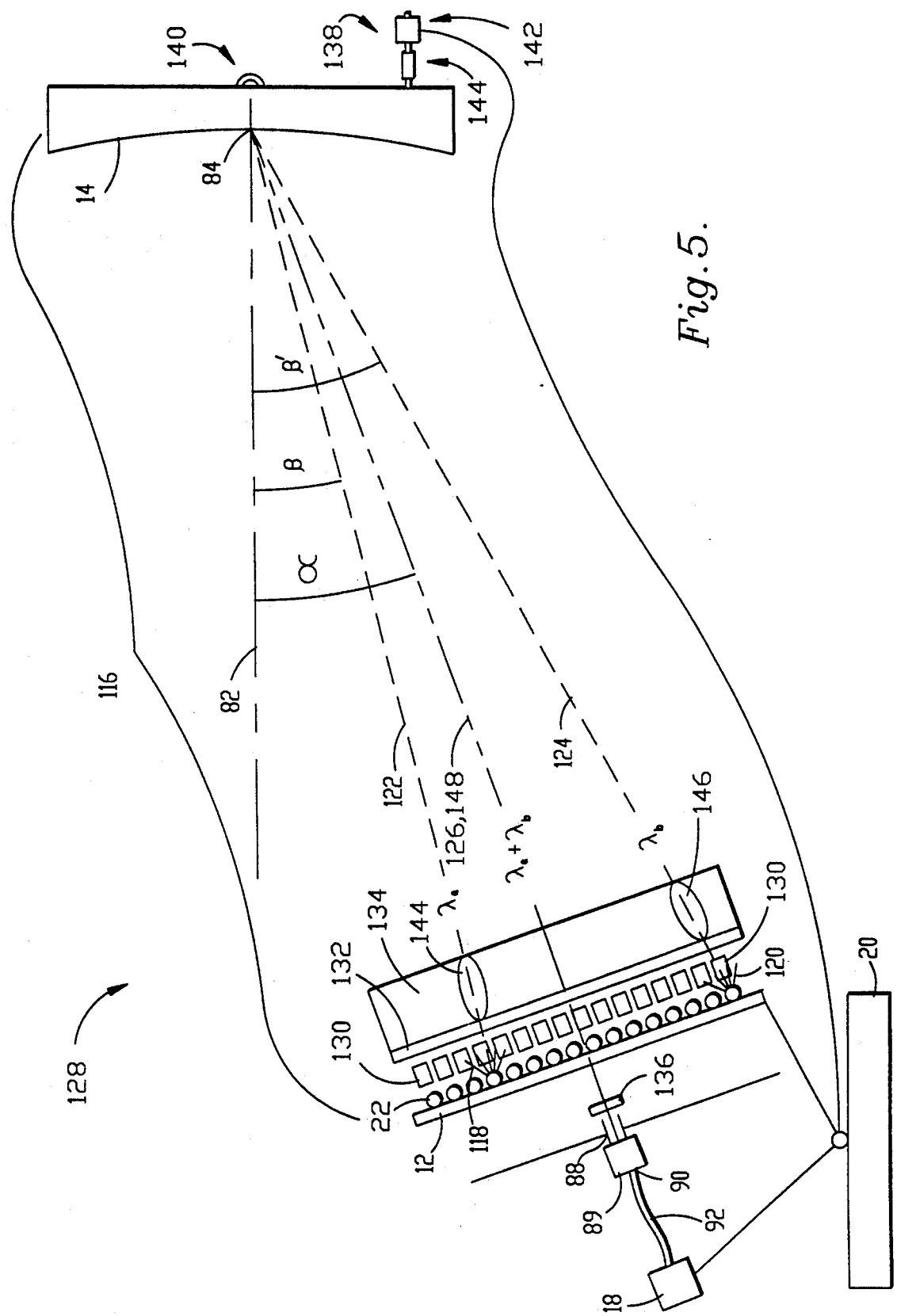
FIG. 5 is a schematic representation of a second embodiment of the present invention illustrating a laser spectrophotometer.
Figure 6:
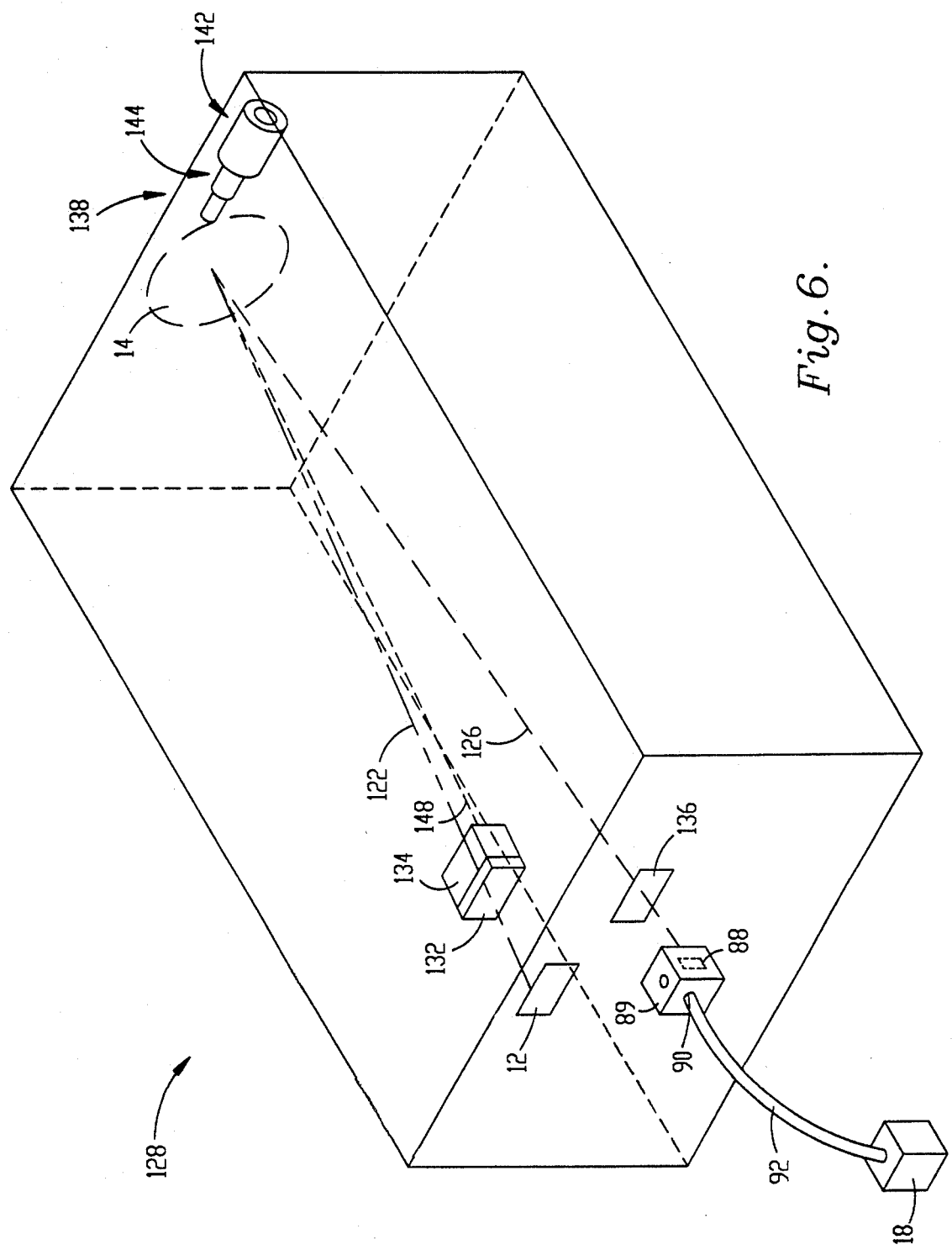
FIG. 6 is a schematic three dimensional representation of the output slit assembly for the spectrophotometer of FIG. 5.

FIG. 5 schematically illustrates laser spectrophotometer 128 as a second embodiment of the present invention, wherein components in common with spectrophotometer 10 are numbered the same. This second embodiment additionally includes lenses 130, first semitransparent mirror 132, organic dye cell 134, second semitransparent mirror 136, and grating positioning assembly 138. In this embodiment, diodes 22 are preferably identical and emit radiation in the same spectral band. While appropriate diodes may be selected from a broad range of possibilities, the most preferred diodes have a high external quantum efficiency and a narrow bandwidth, such as the "superbright" AlGaAs diodes that operate in the visible red to near infrared spectral regions and can have a mere 35 nm halfwidth.

Lenses 130 are positioned respectively in front of diodes 22 and are preferably miniature, graded-index (GRIN) rod lenses which act to focus light by changing the index of refraction in a glass rod. GRIN lenses are commercially available under the trade name "SELFOC" lenses from NSG America, Inc. of Somerset, N.J. Lenses 130 focus light to a point that lies approximately midway through dye cell 134. Mirrors 132,136 have metallic or multiple dielectric coatings, and cooperatively function as a laser oscillator across dye cell 134. Mirrors 132,136 are of a commercially available variety as sold, for example, by Optical Coatings Laboratories, Inc. of San Francisco, Calif. First mirror 132 is transparent to light from array 12, but it is highly reflective to light of wavelengths that fluoresce from dye cell 134. Second mirror 136 is semi-transparent to light of the fluoresced wavelengths from dye cell 134.

Laser dye cell 134 contains an organic laser dye that acts as a laser amplifier by receiving light of primary wavelengths originating from array 12, and then emitting or fluorescing secondary light of lasing frequencies. Suitable compounds are widely known in the art, and generic categories include, by way of example, 3,3'diethylthiacarbocyanine iodide in a glycerol solvent (having a flash pumped peak lasing wavelength of 625 nm), or 1,3,3,1',3'3'-hexamethylindocarbocyanine iodide in a DMSO solvent (having a flash pumped peak lasing wavelength of 740 nm). Some commercial laser dyes are particularly advantageous because they fluoresce in a relatively broad bandwidth, e.g., LD 700 (Perchlorate) as sold by Exciton Corporation of Dayton, Ohio, fluoresces between 700 nm and 840 nm when it is flash pumped by an array of superbright $Ga_{0.4}Al_{0.6}As$ diodes that have a halfwidth of 35 nm from 615 to 685 nm.

Grating positioning assembly 138 includes pivot bracket 140, stepper motor 142, and linkage 144 interconnecting the output shaft of motor 142 with grating 14 so that stepwise activation of motor 142 selectively and precisely shifts grating 14 about the pivot point of bracket 140. Motor 142 is electrically coupled with computer 104 in place of motor 94 for controlled activation thereof for the adjustment of angle $\alpha$.

In operation, diodes 22, e.g., 118, 120, produce light that passes through lenses 130 which operate to focus light from diodes 22 through mirror 132 and to excite dye cell 134 to a fluorescence emission state. The nature of organic laser dye is such that the florescence occurs in localized regions called "cuvettes" around the focal points of each of lenses 130. For example, cuvettes 144, 146 fluoresce along paths 122, 124 across from diodes 118, 120. Cuvette regions 14, 146 fluoresce light containing respective wavelengths $\lambda_a$ and $\lambda_b$ which travel along exemplary paths 122, 124 to diffraction grating 14 for collimation after which the light travels downwardly along path 126 to strike second mirror 136. Light in path 126 contains combined wavelengths $\lambda_a$ and $\lambda_b$ that represent cuvette regions across from each of diodes 22, e.g., cuvettes 144, 146. Second mirror 136 reflects the light back to diffraction grating 14, which reflects the light along upper path 148 back through laser dye cell 134 to first mirror 132. First mirror 132 reflects the light again back along path 148, and this reflective oscillation process repeats itself until the light is of sufficient intensity to pass through second mirror 136, that is, until the assembly begins to lase. In this manner, mirrors 132, 136, diffraction grating 14, and dye cell 134 cooperate to form an amplifier and oscillator apparatus for producing or developing laser light.

During operation, each cuvette in dye cell 134 produces a spectral output over a relatively wide bandwidth which is characteristic of the organic dyes used. Grating 14 then disperses the incident radiation from each cuvette and reflects a very narrow spectral component thereof along path 126. It will be appreciated, however, that the reflected spectral component depends upon the spatial position of the cuvette emitting the radiation relative to grating 14. Thus, each fluorescing cuvette will contribute a different spectral component to the set of components reflected toward second mirror 136.

When a different set of spectral component is desired, computer 104 activates stepper motor 142 to shift grating 14 and thereby reflect a different set of spectral components from the cuvettes toward second mirror 136. In this way, spectrophotometer 128 can be easily and precisely "tuned" to the desired set of frequencies for a particular analysis. In this way, spectrophotometer 128 presents a tunable laser spectrophotometer incorporating a multiplex advantage.

As those skilled in the art will appreciate, the present invention encompasses many variations in the preferred embodiments described herein. For example, the preferred spectrophotometers herein generally depict an optical pathway that contains a concave diffraction grating in an apparatus that is operated in reverse. The optical pathway could also consist of a less preferred conventional Czerny-Turner apparatus that would require more complex and less efficient dedispersion optics. In other embodiments, the optical pathway could incorporate a prism instead of a diffraction grating or other equivalent means for dispersing wavelengths. Similarly, array 10 may consist of identical diodes having a narrow bandwidth that does not require a diffraction grating for dispersion, in which case the optical pathway would linearly extend between the source array and the detector. The optical pathway could alternatively consist of optical fibers where diodes 22 discharge light directly into such fibers for delivery to a sample for analysis.

Of course, there exists a broad range of alternative laser light sources that will function suitably in the invention. Lasers generally require an amplifier and an oscillator, e.g., where mirrors 132, 136 form an oscillator, organic dye cell 134 is the most preferred type of amplifier. Other types of amplifier material, such as titanium sapphire, can be used in place of cell 134. Of particular interest in this regard are standard diodes that themselves produce laser light, such as the injector laser diodes which are made by Meredith Instruments of Glendale, Ariz. These diodes can replace the normal diodes 22 of array 12 to produce laser amplified light, without dye cell 134, because the diode alloy forms its own laser amplifier. Similarly, these laser diodes may employ different combinations of reflective surfaces formed of crystal cleavage planes and reflective coatings to obviate the need for mirrors 132, 136. Laser diodes of various colors are available. Those skilled in the art will appreciate that many different sources of laser light can be used in the invention.

Additionally, Hadamard matrices mathematically require that the matrix have an order of 1, 2, or any multiple of 4, although, one element of the matrix may not be activated in a given scan. Thus, a Hadamard source array could for example, instead of containing 80 elements as depicted for an $S_{79}$ matrix, contain 24, 40 or 320 elements.

APPENDIX 1
LED Categories

| Elemental Semi-Conductor Composition | General Spectral Region Description | Peak Wavelength, nm |
|---|---|---|
| GaAs | Near Infrared | 860 |
| Zn-doped GaAs | Near Infrared | 870 |
| Si-doped GaAs | Near Infrared | 910-1020 |
| Si Doped GaAs | Commercial Emitters Available | 914, 925, 940, 950, and 980 |
| $Al_xGa_{1-x}As$ | Visible to Infrared | 870-650 |
| Zn-doped $Al_{0.4}Ga_{0.6}As$ | Visible | 650 |
| Si-doped $Al_{0.3}Ga_{0.7}As$ | Commercial Infrared Diodes | 870-890 |
| GaP | Visible | non-radiative recombination |
| $GaAs_{1-x}P_x$ | Visible | 870-620 |
| $GaAs_{0.6}P_{0.4}$ | Commercial Red | 630-660 |
| GaP doped with ZnO | Red | 690 |

-continued

APPENDIX I
LED Categories

| Elemental Semi-Conductor Composition | General Spectral Region Description | Peak Wavelength, nm |
|---|---|---|
| N-doped $GaAs_{0.35}P_{0.65}$ | Commercial Red | 630 |
| N-doped $GaAs_{0.15}P_{0.85}$ | Commercial Yellow | 585 |
| N-doped GaP | Commercial Green | 565 |
| $In_xGa_{1-x}As_yP_{1-y}$ | Infrared | 900–2550 |
| $In_{0.18}Ga_{0.82}As$ | Commercial Infrared Diodes | 1064 |
| $In_{0.74}Ga_{0.26}As_{0.56}P_{0.44}$ | Commercial Infrared Diodes | 1300 |
| $In_{0.61}Ga_{0.39}As_{0.85}P_{0.15}$ | Commercial Infrared Diodes | 1550 |
| InGaAsSb/AlGaAsSb | Mid Infrared | 2270 |
| InGaAsSb | Infrared to Mid infrared | 1800–4400 |
| $In_{0.53}Ga_{0.47}As$ | Infrared | 1670 |
| $In_{0.8}Ga_{0.2}As$ | Infrared | 2550 |
| SiC | Visible Blue | 470 |
| $Cd_xHg_{1-x}Te$ | Mid Infrared | 3000–15000 |
| $Cd_xHg_{1-x}Se$ | Mid Infrared | 3000–15000 |
| $Pb_xS_{1-x}Se$ | Mid Infrared | 5000–9000 |
| $Pb_xSn_{1-x}Te$ | Mid Infrared | 7000–40000 |
| $Pb_xSn_{1-x}Se$ | Mid Infrared | 9000–40000 |

We claim:

1. A spectrophotometer apparatus comprising:
   an electromagnetic radiation source array having a plurality of activatable radiation source elements configured for activation in a plurality of multiplexing encodement patterns, said elements having a solid state construction;
   means including a detector for detecting radiation emissions from said elements, and for producing detector signals representative thereof;
   structure defining an optical pathway for directing said emissions from said array to said detecting means; and
   control means including
      means coupled with said array for selectively activating said elements in order to produce a plurality of sequential multiplexing encodement patterns at a pattern rate of at least one patter per second, at least certain of said encodement patterns including simultaneous activation of a number of source elements and generation of a plurality of discrete emissions having different characterizing parameters, said pathway-defining structure including means for combining said different emissions and directing the combined emissions to said detector, and
      means coupled with said detecting means for receiving and processing said detector signals, including detector signals representative of said combined emission, for storing a plurality of values respectively representative of said detector signals produced by said detector during said encodement patterns, and for performing a multiplex analysis of said values in correspondence with said encodement patterns in order to determine the individual intensities of emissions from each of said elements as received by said detecting means.

2. The apparatus as set forth in claim 1, said array including elements operable for emitting radiation in different spectral bands respectively.

3. The apparatus as set forth in claim 1, said radiation including visible light.

4. The apparatus as set forth in claim 1, said radiation including near infrared.

5. The apparatus as set forth in claim 1, said elements operable for emitting radiation in regions selected from the classifications consisting of visible, near infrared, infrared, and mid infrared.

6. The apparatus as set forth in claim 1, said elements including light emitting diodes.

7. The apparatus as set forth in claim 1, said multiplexing encodement patterns including Hadamard encodement patterns.

8. The apparatus as set forth in claim 1, said multiplexing encodement patterns including Fourier frequency oscillations.

9. The apparatus as set forth in claim 1, said elements being arranged in a configuration presenting four rows with twenty of said elements in each row.

10. The apparatus as set forth in claim 1, said control means including means for energizing said elements in an oscillating manner during activation thereof in order to produce corresponding oscillations in said signals for eliminating the effects of electronic noise on said signals.

11. The apparatus as set forth in claim 10, said oscillating manner being a square wave.

12. The apparatus as set forth in claim 11, said energizing means including means for oscillating the energization of said elements at least ten times for each pattern activation.

13. The apparatus as set forth in claim 1, said control means including a computer, a Hadamard pattern generator and an array driver operably configured for oscillating the energization of said elements in bursts within Hadamard pattern activations, said computer including means for digitally filtering said signals to reduce background noise therein.

14. The apparatus as set forth in claim 1, said detecting means including a detector selected from the group consisting of a photodiode, a photoresistor, and a phototransistor.

15. The apparatus as set forth in claim 1, said structure further including
   means defining an output slit interposed in said pathway between said array and detector means, and
   a diffraction grating placed in said pathway for receiving said radiation from said array and for directing a selected set of spectral components of the radiation from said elements through said output slit for impingement on said detector means.

16. The apparatus as set forth in claim 15 further including means for selectively changing the spacial relationship between said array, grating, slit and detector means for directing a different set of spectral components onto said detector means.

17. The apparatus as set forth in claim 16, said changing means including a mechanism coupled with said slit defining means for altering the spatial position thereof relative to said grating so that a different set of spectral components are directed through said slit onto said detector means.

18. The apparatus as set forth in claim 17, said mechanism including a stepper motor.

19. The apparatus as set forth in claim 1, said pattern rate including 5,000 patterns per second.

20. The apparatus as set forth in claim 1, said encodement patterns including Hadamard patterns, said multiplex analysis including a Hadamard analysis.

21. The apparatus as set forth in claim 1, said optical pathway including laser means for developing laser light.

22. The apparatus as set forth in claim 21, said laser means including
an organic laser dye cell interposed in said pathway,
a first semitransparent mirror positioned between said array and said dye cell, and
a second semitransparent mirror positioned in said pathway between said dye cell and said detector,
said dye cell and mirrors cooperatively making up a laser optically energized by radiation produced by said elements.

23. The apparatus as set forth in claim 22, said laser structure further including lenses respectively interposed between said elements and said first mirror for focusing the radiation emitted by said elements at respective focal points within said dye cell.

24. The apparatus as set forth in claim 21, said laser means including laser injector diodes.

25. The apparatus as set forth in claim 1, said optical pathway incorporating a concave, aberration corrected, holographic diffraction grating for collimating and dispersing radiation.

26. The apparatus as set forth in claim 1, said control means including a computer.

27. A spectrophotometer apparatus comprising:
an electromagnetic radiation source array having a plurality of activatable radiation source elements configured for activation in a plurality of Hadamard encodement patterns, said elements having a solid state construction;
structure defining an optical pathway for directing emissions from said array, said optical pathway having a concave diffraction grating for dispersing emissions from said array and having an optical slit;
a detector positioned for receiving emissions from said optical pathway and responsive thereto for producing detector signals representative thereof;
an electronically adjustable mechanism for selectively altering a wavelength defining angular relationship between said detector, said diffraction grating, and said array; and
control means including
a computer, an array driver, and a Hadamard pattern generator operable for energizing said elements in an oscillating burst manner during pattern activation thereof in order to produce corresponding oscillations in said signals, at least certain of said patterns including simultaneous activation of a number of source elements and generation of a plurality of different emissions having different characterizing parameters, said optical pathway serving to combine said different emissions and directing the combined emissions to said detector,
the computer being coupled with said detector and operable for receiving, filtering, and processing said detector signals, for storing a plurality of values respectively representative of said detector signals produced by said detector during said encodement patterns, and for producing a Hadamard analysis of said values in correspondence with said encodement patterns in order to determine the individual intensities of emissions from each of said elements as received by said detecting means.

28. A laser spectrophotometer comprising:
an electromagnetic radiation source array having a plurality of activatable radiation source elements configured for allowing activation in a plurality of multiplexing patterns, said elements having a solid state construction;
a detector for producing signals in response to electromagnetic radiation;
structure defining an optical pathway for directing radiation from said array to said detector, said optical pathway including
respective lenses for focusing electromagnetic radiation from said elements of said array,
a first semi-transparent mirror positioned to receive focused electromagnetic radiation from said lenses, said first semi-transparent mirror tending to allow passage therethrough of light from said array,
a laser amplifier cell for fluorescing light of a secondary wavelength category, said cell positioned to receive light passing through said first semi-transparent mirror, said first semi-transparent mirror tending to reflect light of the secondary wavelength category,
a diffraction grating for collimating fluoresced light from said cell by reflectively dispersing such light into various wavelength components,
a second semi-transparent mirror for reflecting collimated light, said second semi-transparent mirror tending to partially reflect light of the secondary wavelength category;
an electronically adjustable mechanism for selectively altering a wavelength defining angular relationship between said detector, said diffraction grating, and said array;
control means including
a computer, an array driver, and a Hadamard pattern generator operably configured for energizing said elements in an oscillating manner during pattern activation thereof in order to produce corresponding oscillations in said signals, and
said computer operably coupled with said detector for receiving, filtering, and processing said signals and for producing a multiplex analysis thereof,
said computer coupled with said mechanism in an operable manner for altering said angular relationship.

29. An electromagnetic radiation source array comprising:
a plurality of activatable radiation source elements, said elements having a solid state construction;
means for selectively activating ensembles of said elements simultaneously in a plurality of multiplexing encodement patterns, said activating means including electronic controls having a computer, a pattern generator and a driver for activating said elements in multiplexing encodement patterns at a rate of at least one pattern per second, said multiplexing encodement patterns selected from the group consisting of Hadamard and Fourier patterns.

30. A spectrophotometer apparatus comprising:
an electromagnetic radiation source array having a plurality of activatable radiation source elements configured for activation in a plurality of multiplexing encodement patterns, said elements having a solid state construction;

means including a detector for detecting a combination of emissions from said elements activated in said patterns to simultaneously impinge upon said detector, and for producing signals representative thereof representing a combined intensity of said combined radiations at said detector;

structure defining an optical pathway for directing said emissions from said array to said detecting means; and control means including
    means coupled with said array for selectively activating said elements in order to produce a plurality of sequential multiplexing encodement patterns at a pattern rate of at least one pattern per second, and
    means coupled with said detecting means for receiving and processing said signals, and for producing a multiplex analysis thereof advantage from said detecting means by resolving said signals into respective discrete intensities corresponding to each activated element, said optical pathway including laser means for developing laser light.

31. The apparatus as set forth in claim 30, said laser means including
    an organic laser dye cell interposed in said pathway,
    a first semitransparent mirror positioned between said array and said dye cell, and
    a second semitransparent mirror positioned in said pathway between said dye cell and said detector,
    said dye cell and mirrors cooperatively making up a laser optically energized by emissions produced by said elements.

32. The apparatus as set forth in claim 31, said laser structure further including lenses respectively interposed between said elements and said first mirror for focusing the radiation emitted by said elements at respective focal points within said dye cell.

33. The apparatus as set forth in claim 30, said laser means including laser injector diodes.

34. A method of spectrophotometric analysis comprising:
    providing an array having a plurality of light emitting diodes having a solid state construction;
    simultaneously activating selected ones of said diodes in successive multiplexing encodement patterns, each of said patterns including a plurality of different emissions having different characterizing parameters;
    combining representative spectral emissions from the individual diodes, to produce combined emissions;
    producing signals representative of an intensity of said combined emissions;
    storing values representative of said signals; and
    performing a multiplex analysis of said values in correspondence with said encodement patterns in order to resolve said values into respective intensity contributions from each of said activated diodes.

* * * * *